March 15, 1927.  1,621,068
C. J. HOLSLAG
ELECTRIC ARC WELDING AND CUTTING SYSTEM
Filed Feb. 9, 1923
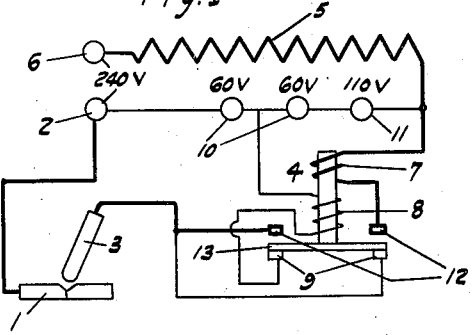
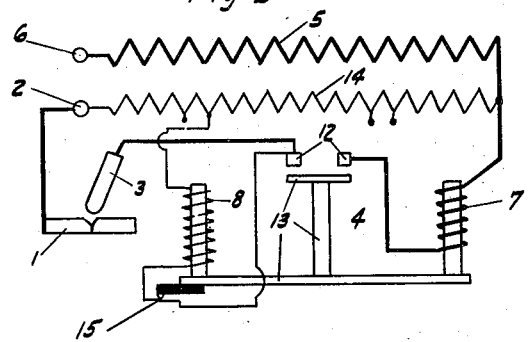
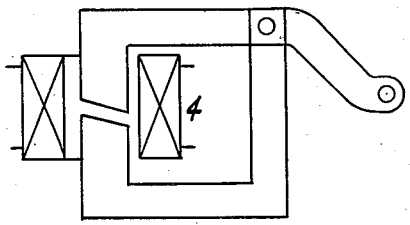
INVENTOR
CLAUDE J. HOLSLAG.
BY
A. D. T. Libby
ATTORNEY Patented Mar. 15, 1927.

1,621,068

UNITED STATES PATENT OFFICE.

CLAUDE J. HOLSLAG, OF SOUTH ORANGE, NEW JERSEY, ASSIGNOR TO ELECTRIC ARC CUTTING & WELDING COMPANY, OF NEWARK, NEW JERSEY.

ELECTRIC-ARC WELDING AND CUTTING SYSTEM.

Application filed February 9, 1923. Serial No. 617,919.

This invention relates to electric arc welding and cutting and is a continuation in part of my prior application, Serial No. 521,145 filed December 9, 1921, now Patent 1,549,874 issued Aug. 18, 1925. In said previously filed application it has been pointed out that for certain classes of work there is a demand for a resistor-reactor welding system, which generally consists of a suitable resistance, reactance and the necessary apparatus to connect these together into a welding system. My present invention is directed to a system for supplying this special demand.

In said previous application, I pointed out the advantages of a reactor having a core which is automatically moved to give the necessary results and it is one of the objects of my present invention to enlarge on this particular feature by pointing out and claiming more in detail the use of a relay-reactor, which performs a double function of a relay and a reactor, as the name implies.

As pointed out in the patent above referred to a reactor of the open core type permits the current to build up rapidly when striking the arc, thereby making it easy to establish the arc, however, after the arc has started, it is advantageous to have a reactor of the closed core type as this type of reactor is found to work better during the welding operation, so the ideal arrangement is to have an open core reactor for starting and a closed core reactor for welding.

Another object of my invention is to provide means for controlling a relatively high voltage of a direct current supply, so that the voltage normally across the arc electrodes, when they are not in use, is reduced to a safe value, whereby operators will not receive injurious shocks; and furthermore automatically control the current so the arc circuit is opened should the arc length be extended by the operator to a point where improper or poor welding is being done.

Other objects will be apparent to one skilled in this art after a study of the specification and drawing, wherein:

Figure 1 is a schematic welding system in which the reactor serves also as a controlling relay to reduce the voltage of the source of supply across the electrodes during the non-welding period.

Figure 2 is a view similar to Fig. 1 but in this case the relay is divided, the two windings being separated but both adapted to actuate a common movable member which controls the arc circuit.

Figure 3 is a diagrammatic view of the reactor-relay shown in Figs. 1 and 2, but with all the levers, springs and contacts, etc., removed for the sake of clarity.

In the drawings, 1 indicates a work piece shown in the form of a metal block, the same being connected to the terminal 2 of a source of electric power. The welding electrode 3, which may be of any suitable material, is connected through a reactor 4 to the other terminal 6 of the source of current. In the line and in series with the reactor, electrode and work piece is an adjustable resistance 5 of low value to prevent a dead short circuit, and to act as a steadying or stabilizing resistance during the welding operation.

In Fig. 1, the reactor 4 is shown diagrammatically in the form of a double wound relay having a series winding 7 and a shunt winding 8, which has one end normally connected through the back contacts 9 of the relay with the movable electrode 3 and the other end is connected into a potentiometer which as shown in Fig. 1 consists of two 60 volt lamps 10 and a 110 volt lamp 11 all connected in series and between the junction of the resistance 5 and the winding 7 and the terminal 2. The voltage of the lamps 10 and 11, of course, may be suitably chosen to meet the voltage of the source of supply. From the diagram, Fig. 1, it will be seen that the voltage across the electrodes on open circuit is that across one lamp or approximately 60 volts; hence the operator in changing electrodes or handling the electrode holder will not get any serious shocks. In operation, when the electrode 3 is touched to the work 1, the circuit is completed through the winding 8 which operates the reactor-relay 4 and the series winding is then brought into the arc circuit through the contacts 12 being joined together by the contactor strip 13. When the relay is actuated the shunt winding 8 is cut out, but before this takes place the winding 7 is brought into operation and this holds the relay in closed position until the arc is accidentally broken at the electrodes or the operator increases the arc length so that the voltage across the arc raises and the current reduces so the winding 7 is not strong enough then to hold the relay closed. It is to be understood that by accidentally opening the arc circuit I mean that sometimes an obstruction gets in the way of the arc stream and the arc will go out, even though the length be suitable for proper welding.

In Fig. 2, the reactor-relay 4 is divided in two parts, the winding 7 being by itself and the winding 8 on a separate core. This arrangement is particularly advantageous if the source of power is alternating in character. It may be stated at this point that I preferably use a laminated construction for the reactor-relay 4. The member 13 is adapted to be acted on by each of the windings 7 and 8 to connect the contacts 12 together as in Fig. 1. The winding 8 is connected to the potentiometer resistance 14 at any suitable point to give the proper voltage across the winding 8, which winding together with the winding 7 functions in a similar manner as in Fig. 1. However, the winding 8 is cut out of circuit by a pair of auxiliary contacts 15 actuated by the movable member of the reactor-relay 4.

It will be readily appreciated that since the arrangements shown in the drawing are schematic that the principles of my welding systems may be carried out by the use of numerous designs, so far as the particular pieces of apparatus are concerned and I, therefore, do not wish to be limited to any particular design of a relay, or compensating or stabilizing resistance as these designs may be varied through a wide range.

Having thus described my invention, what I claim is:

1. In an arc welding and cutting system, a main source of current for the arc, a resistance and a reactor having a magnetic core normally opened, but adapted to be closed and having a series and shunt winding, said series winding adapted to be connected with the arc and said resistance but normally in an open circuit, said shunt winding being normally connected across the arc electrodes through a portion of a potentiometer circuit and adapted, when the electrodes are brought together, to close the welding circuit through said series winding and to close said core.

2. In an arc welding and cutting system, a main source of current for the arc, a resistance and a reactor having a normally open magnetic core and a winding in series with said resistance and arc electrodes but normally open circuited at the reactor, said reactor having a second winding connected to the arc electrodes through a portion of a potentiometer circuit when the arc is extinguished and adapted to close the core and arc circuit through the series winding when the arc electrodes are brought together.

3. In an arc welding and cutting system, a main source of current for the arc, a resistance and a reactor having a magnetic core normally opened, but adapted to be closed and having a winding in series with the resistance and arc electrodes, a second resistance bridged from the junction of the first resistance and reactor series winding to one electrode, and a second winding on the reactor normally connected to the second resistance intermediate its ends and the other electrode.

4. In an arc welding and cutting system, a main source of current for the arc, a resistance and a combined relay and reactor having a magnetic core normally opened, but adapted to be closed and having a winding in series with the resistance and arc electrodes but normally open circuited at the relay, a second winding on the relay normally connected across the electrodes through a portion of a potentiometer circuit and adapted to actuate the relay when the electrodes are brought together, said series winding then serving as a stabilizing winding to the arc and also holding the relay magnetic circuit as well as the arc current circuit closed thereby opening the shunt winding.

5. In an arc welding and cutting system, a main source of current for the arc, a reactor relay having a laminated normally open circuit magnetic core adapted to be closed and having two windings and a movable part under the influence of each winding, one of said windings being normally connected across the arc electrodes through a portion of a potentiometer circuit and adapted, when the electrodes are brought together, to close the core and the welding circuit through the other winding, thereby forming out of the relay a single reactor and stabilizer in the welding circuit.

6. In an arc welding and cutting system, a main source of current for the arc, a reactor relay having a laminated normally open circuit magnetic core adapted to be closed and having two windings and a movable part including a part of the core under the influence of each winding, one of said windings being normally connected across the arc electrodes through a portion of a potentiometer circuit and adapted, when the electrodes are brought together, to close the core and the welding circuit through the other winding, both of said windings acting to move the movable part of the reactor relay in the same direction and the one in series in the welding circuit serving to hold the other winding out of circuit while the welding is going on and also serving as a reactor and stabilizer.

7. In an arc welding and cutting system, a main source of current for the arc, a reactor relay having a laminated normally open circuit magnetic core adapted to be closed and having two windings and a movable part including a part of the core actuated by first one winding on touching the arc electrodes and secondly by the other winding to hold the core and the welding circuit closed while welding is being done, one of said electrodes being connected directly to one terminal of said source of current, a potentiometer resistance connected across from the first mentioned electrode to the one terminal of the second mentioned winding, said first mentioned winding being connected to the potentiometer resistance intermediate its ends and the other arc electrode.

8. In an arc welding and cutting system, a main source of current for the arc, a reactor in the arc circuit having a normally opened circuit magnetic core but adapted to be closed and having two windings, and a movable part including a part of the core acted on by each of said windings, one of said windings being normally connected across the arc electrode through a resistance and adapted when the electrodes are brought together to close the core and the welding circuit through the other winding.

9. In an arc welding and cutting system, a main source of current for the arc, a reactor in the arc circuit having a normally open magnetic core and two windings and a movable part acted on by each of said windings to close the core and welding circuit, one of said windings being normally connected across the arc electrodes through a resistance and supplied with a voltage materially less than the voltage of said source of current, but adapted when the electrodes are brought together to close the welding circuit through the other winding, said other winding being adapted to open the arc circuit and core when the arc length reaches a predetermined value.

10. In an arc welding and cutting system, a source of D. C. current of relatively high voltage, means for limiting and controlling this voltage to a welding voltage, consisting of; a potentiometer connected to said source of current, a steadying resistance in the arc circuit, and a relay having a movable part for controlling the arc circuit with but two windings, one for actuating the moving part to close the arc circuit when the electrodes are brought together and the other in the arc circuit and acting to open the arc circuit when the voltage across the arc raises to a predetermined value.

In testimony whereof, I affix my signature.

CLAUDE J. HOLSLAG.